(12) United States Patent
Sim

(10) Patent No.: US 8,157,409 B2
(45) Date of Patent: Apr. 17, 2012

(54) LIGHT EMITTING MEANS

(75) Inventor: Woo-Kyung Sim, Paju (KR)

(73) Assignee: Centro Corporation, Sungseok-Dong, Ilsan-Ku, Kyungki-Do, Koyang (KR)

( * ) Notice: Subject to any disclaimer, the term of this patent is extended or adjusted under 35 U.S.C. 154(b) by 231 days.

(21) Appl. No.: 12/729,292

(22) Filed: Mar. 23, 2010

(65) Prior Publication Data

US 2011/0096539 A1 Apr. 28, 2011

(30) Foreign Application Priority Data

Oct. 27, 2009 (KR) .................. 10-2009-0102499

(51) Int. Cl.
*F21V 9/00* (2006.01)
(52) U.S. Cl. ........ 362/231; 362/655; 362/656; 362/196; 362/184; 362/197; 362/652
(58) Field of Classification Search .................. 362/231, 362/235, 652, 655, 656, 184, 202, 197, 199
See application file for complete search history.

(56) References Cited

U.S. PATENT DOCUMENTS

| | | | | |
|---|---|---|---|---|
| 5,299,107 A | * | 3/1994 | Ratcliffe et al. | 362/158 |
| 5,983,553 A | * | 11/1999 | Gordon | 43/17.6 |
| 6,318,879 B1 | * | 11/2001 | Huang | 362/205 |
| 6,481,148 B1 | | 11/2002 | Lindgren | |
| 6,527,408 B1 | * | 3/2003 | Korenek, Jr. | 362/184 |

* cited by examiner

*Primary Examiner* — Evan Dzierzynski
(74) *Attorney, Agent, or Firm* — Lexyoume IP Group, PLLC.

(57) ABSTRACT

The present invention provides a light emitting means having a structure that can be used as a light emitting ornament in a sports ground or an event location, a fishing light for the long-line fishery, or light emitting means that can be formed to a specific shape by being continuously assembled with another light emitting means. The light emitting means includes: a first housing made of a transparent material and having one end formed as a plug; a second housing made of a transparent material and having a socket corresponding to the plug and that can be separated or coupled to the first housing; a first substrate having a cathode at the center thereof and LEDs arranged around the cathode; a second substrate having an anode at the center thereof and LEDs arranged around the anode; a tubular diffuser made of a light guide material and having mounting holes in which the LEDs are respectively mounted and a space to which a battery is provided therein; a stud having the hole and male threads provided to the first housing; and a holed boss having female threads provided to the second housing. The light emitting means further includes a connector, a cube connector, and a double-male connector for connecting the stud of the first housing and the holed boss of the second housing.

20 Claims, 8 Drawing Sheets

LIGHT EMITTING MEANS

CROSS-REFERENCE TO RELATED APPLICATION

This application claims priority to and the benefit of Korean Patent Application No. 10-2009-0102499 filed in the Korean Intellectual Property Office on Oct. 27, 2009, the entire contents of which are incorporated herein by reference.

BACKGROUND OF THE INVENTION (a) Field of the Invention

The present invention relates to a light emitting means, and particularly relates to a light emitting means that can be used as an ornament by connecting two or more light emitting means in a row, wherein each light emitting means can be used as a portable light emitting ornament or a fishing light that realizes a fish gathering effect in the fishing industry.

(b) Description of the Related Art

A neon sign is the most well-known light ornament means. The neon sign can have a very splendid design with a blinking visual effect and dazzling colors. Since the neon sign has a structure in which a sealed glass tube is sealed after injecting neon gas therein and light is emitted by applying a high voltage to opposite ends of the tube, it is not portable and can be handled only by a skilled person.

Another type of light emitting means for a light ornament has a structure in which electric bulbs or LEDs are continuously arranged in a colorless or colored transparent hose and the bulbs or LEDs are turned on/off. The light emitting hose is easy to install but it cannot be portable so that the usage of the hose is limited to a sign of a danger zone, an outer boundary of a building, a tree decoration, etc.

A lantern is a well-known portable light emitting means, but it has a weak light ornament effect.

A chemical light that emits light with reaction of a chemical material has been disclosed as a portable and convenient light emitting means, and this is utilized as a light source for a light emitting ornamental effect when it is grouped in a sports ground or an event location.

However, the chemical light cannot provide a blink effect and causes environmental pollution.

Most of the disclosed light emitting means provide a light ornament effect by being grouped, and cannot be deformed to different shapes.

The inventor of the present invention has disclosed a fishing light in Korean Patent No. 433009 and Korean Utility Patent Nos. 302011, 302012, and 316713. The fishing light is formed of a transparent housing in which a battery and a light emission circuit are provided so that it can be used as an excellent light emitting means in a sports ground or an event location by improving a light ornament effect in structure.

The light emitting means that can be improved as described above can also be used as a fishing light for the long-line fishery.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a light emitting means that can be reused by adding a blink function that cannot be provided by a chemical light used in a sports ground or an event location, and that is formed in a portable and convenient structure.

The light emitting means according to the present invention can be used as a light ornament in a sports ground or an event location by continuously assembling two or more light emitting means to form a light emitting ornament having a specific shape.

Further, the light emitting means according to the present invention can be used as a fishing light for the long-line fishery in addition to as the light emitting ornament.

A light emitting means according to an exemplary embodiment of the present invention may include: a first housing made of a transparent material and having one end formed as a plug; a second housing made of a transparent material, and having a socket corresponding to the plug and that can be separated or coupled to the first housing; a first substrate having a cathode at the center thereof and LEDs arranged around the cathode; a second substrate having an anode at the center thereof and LEDs arranged around the anode; and a tubular diffuser made of a light guide material and having mounting holes in which the LEDs are respectively mounted and a space to which a battery is provided therein.

A light emitting means according to another exemplary embodiment of the present invention may include: a first housing made of a transparent material and having one end formed as a plug and the other end provided with a stud where a male thread and a hole are formed; a second housing made of a transparent material, and having a holed boss provided with a socket corresponding to the plug and a female thread corresponding to the male thread and that can be separated or coupled to the first housing; a first substrate having a cathode at the center thereof and LEDs arranged around the cathode; a second substrate having an anode at the center thereof and LEDs arranged around the anode; and a tubular diffuser made of a light guide material and having mounting holes in which the LEDs are respectively mounted and a space to which a battery is provided therein, and a lead wire disposed in parallel and electrically connecting the first and second substrates.

The tubular diffusers are provided as a pair and arranged in the same axis direction in the first and second housings, and at least two batteries are arranged in series therein so that power can be stably supplied.

The first and second substrates may be electrically connected by lead wires arranged parallel with each of the tubular diffusers, and the lead wires may be electrically connected to each other through a space therebetween by a bush conductor supported by a conductive plate between the two tubular diffusers while being tensioned by a spring.

A guide groove of the plug may include a path with a step shape formed by differentiating heights of first and second steps to introduce a protrusion of the socket to the two steps during relative rotation of the first and second housings.

In addition, the tubular diffuser has a lead hole so that the lead wire may extend through the lead hole.

A LED color pattern of the light emitting means may be realized by one selected from patterns of blue, green, white, and red colors, and the patterns include 4 combinations of single colors, 18 combinations of two colors, 24 combinations of three colors, and 12 combinations of four color.

The light emitting means may be used as a fishing light by connecting a typical snap through the hole formed in the stud of the first housing.

A light emitting means according to another exemplary embodiment of the present invention further includes a connector, a cube connector, and a double-male connector in addition to the constituents of the light emitting means according to the above-described exemplary embodiment of the present invention. The connector formed as a rectangular body has a threaded connector stud with a hole at one side thereof and has a pair of threaded holes at the other side thereof such that the stud of the first housing can be screwed thereto. The cube connector is formed of a cube body and has a threaded hole integrally formed at the center of an external surface of the cube body. The holed boss of the second housing and the threaded hole of the cube connector are connected through the double-male connector.

The light emitting means related to the present invention has a structure in which an LED light emitted from the first and second housings is passed through the transparent first and second housings and emitted to the surroundings while diffused along the axis direction of the tubular diffuser so that the size of the light emitter looks significantly large compared to a structure of simply light-emitting an LED. In addition, since the straightness of the LED light is greatly reduced while diffused through the tubular diffuser, light emitted to the outside becomes gentle.

The configuration of the light emitting means according to the present invention is portably and reusable, and does not cause environmental pollution.

In addition, the light emitting means according to the present invention can be used as a fishing light by connecting the snap through the hole formed in the stud of the first housing.

When the light emitting means is used as the fishing light, the light emission area is increased through the tubular diffuser and four LEDs provides various colored light emission pattern effects so that a significant fish attraction effect can be expected.

The light emitting means according to the present invention may be connected with another light emitting means in the axis direction by using the stud and the holed boss respectively provide in the first housing and the second housing, and a specific shaped light emission ornament may be provided because several light emitting means can be continuously connected in two directions, four directions, and six directions by using the connector, the cube connector, or the double-male connector.

Thus, a grouped light emitting ornamental effect can be provided in a sports ground or an event location and a three-dimensional light ornament such as a blinking advertising tower or display also can be provided.

Figure 1:
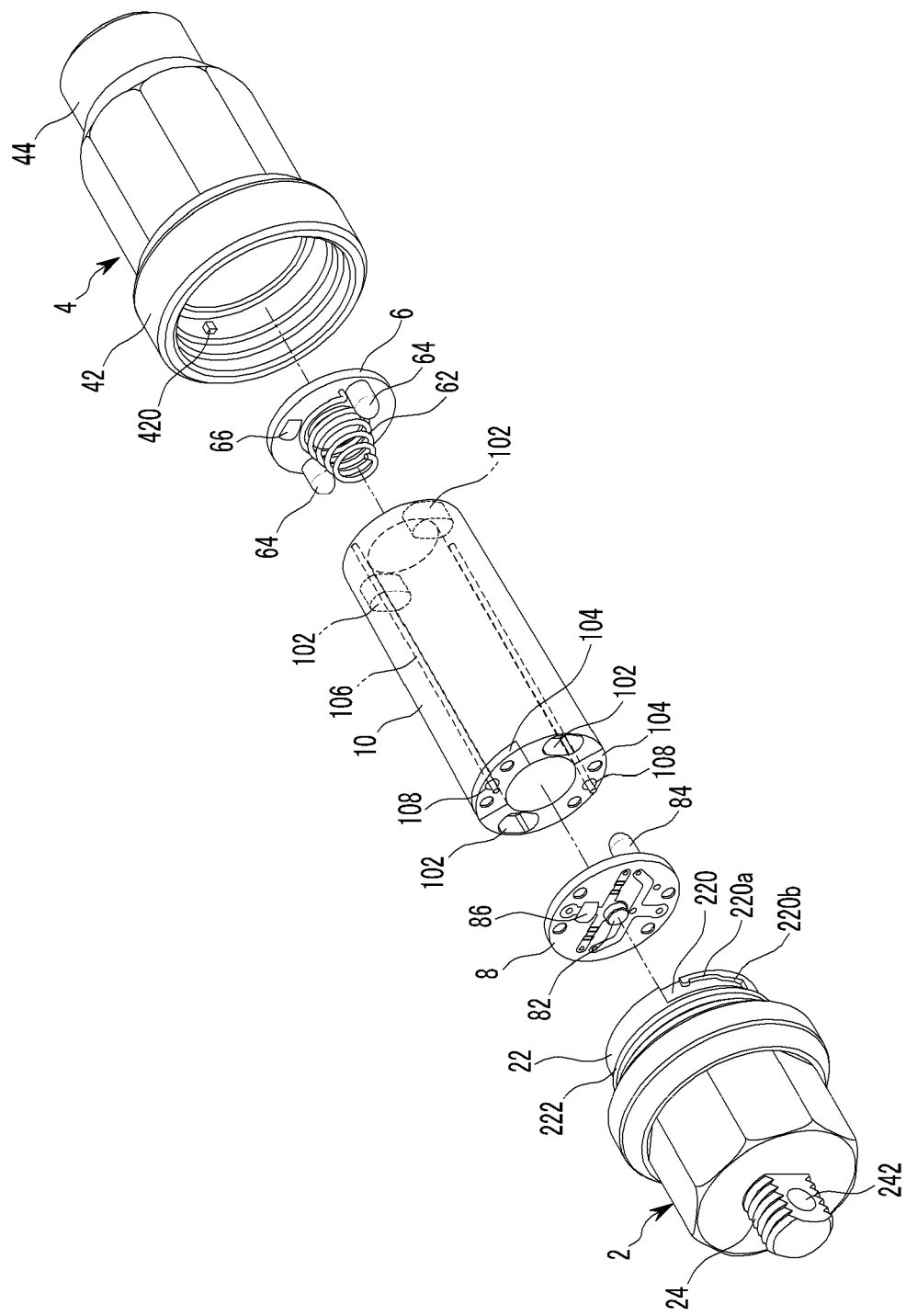
FIG. 1 is an exploded perspective view of light emitting means according to an exemplary embodiment of the present invention.

<Description of Reference Numerals Indicating Primary Elements in the Drawings>

| | |
|---|---|
| 2: first housing | 22: plug |
| 220: groove | 220a: first step |
| 220b: second step | 222: O-ring |
| 24: stud | 240: male threads |
| 242: hole | 4: second housing |
| 42: socket | 420: protrusion |
| 44: holed boss | 440: female threads |
| 6: first substrate | 62: cathode |
| 64: LED | 8: second substrate |
| 82: positive electrode terminal | 84: LED |
| 10: tubular diffuser | 102: LED mount hole |
| 104: conductive plate | 106: lead wire |
| 108: lead hole | 110: spring |
| 112: bush conductor | 12: battery |
| 14: switch panel | 16: connector |
| 162: body | 164: connecting stud |
| 166: connecting hole | 168: connecting nut |
| 18: cube connector | 182: cube body |
| 184: threaded hole | 186: double-male connector |

DETAILED DESCRIPTION OF THE EMBODIMENTS

The advantages and merits of the present invention will be more clearly understood through preferred exemplary embodiments with the accompanying drawings.

FIG. 1 is an exploded perspective view of light emitting means according to an exemplary embodiment of the present invention. The light emitting means includes a first housing 2 and a second housing 4 that can be divided or coupled in an axis direction and that are made of a colorless or colored transparent material, and a first substrate 6, a second substrate 8, and a tubular diffuser 10 formed of a light guide material are disposed between the first and second housings 2 and 4.

Portions where the first housing 2 and the second housing 4 are combined are respectively formed as a plug 22 and a socket 42 that are correspondingly hooked to each other.

A pair of grooves 220 are formed symmetrically on an external circumferential surface of the plug 22 and the plug 22 is provided with at least one O-ring 222, and the socket 42 corresponding to the plug 22 includes a pair of inward protrusions 420 symmetrically disposed on an internal circumferential surface thereof and sliding along the groove 220 of the plug 22.

The grooves 220 of the plug 22 have the protrusions 420 of the socket 42 introduced thereto during relative rotation of the first and second housings 2 and 4 to tightly couple the first and second housings 2 and 4 together. It is preferred that each groove 220 is formed with a step shape with a first step 220a and a second step 220b that are different in height, and in this case, the coupling between the two housings 2 and 4 becomes strong while the relative rotation can be manipulated with little power.

When desired light emitting means is only used individually, the external shapes of the first and second housings 2 and 4 are limited to the above-described shapes.

A cathode 62 is provided at the center of the first substrate 6 and a pair of LEDs 64 and an IC chip 66 having a circuit for powering the LEDs 64 are provided around the cathode 62, and an anode 82 is provided at the center of the second substrate 8 and a pair of LEDs 84 and an IC chip 86 for powering the LEDs 84 are provided around the anode 82.

LED mounting holes 102 are formed at lateral ends of the tubular diffuser 10 interposed between the first and second substrates 6 and 8 to respectively receive the four LEDs 64, 64, 84, and 84.

A conductive plate 104 may be provided at one end of the tubular diffuser 10 in order to form a conductive state between the first substrate 6 and the second substrate 8. The conductive plate 104 in the present exemplary embodiment is provided at both ends of the tubular diffuser 10, but it is not necessarily provided as a pair.

A lead wire 106 electrically connecting the first and second substrates 6 and 8 is stably connected to the conductive plate 104.

In the present exemplary embodiment, the lead wire 106 extends through a lead hole 108 of the tubular diffuser 10, but this is not restrictive. That is, the lead wire 106 may extend via the inside or the outside of the tubular diffuser 10.

In addition, the conductive plate 104 may be omitted if the conductive state can be achieved between the first and second substrates 6 and 8 and the lead wire 106 can be stably connected without depending on the conductive plate 104.

In order to dedicate the use of the light emitting means of the present invention to a fishing light, at least a stud 24 having a hole 242 at an opposite side of the plug 22 should be provided in the first housing 2, and a housing similar to this is disclosed in Korean Patent No. 433009 and Korean Utility Patent Nos. 302011, 302012, and 316713.

Figure 2:
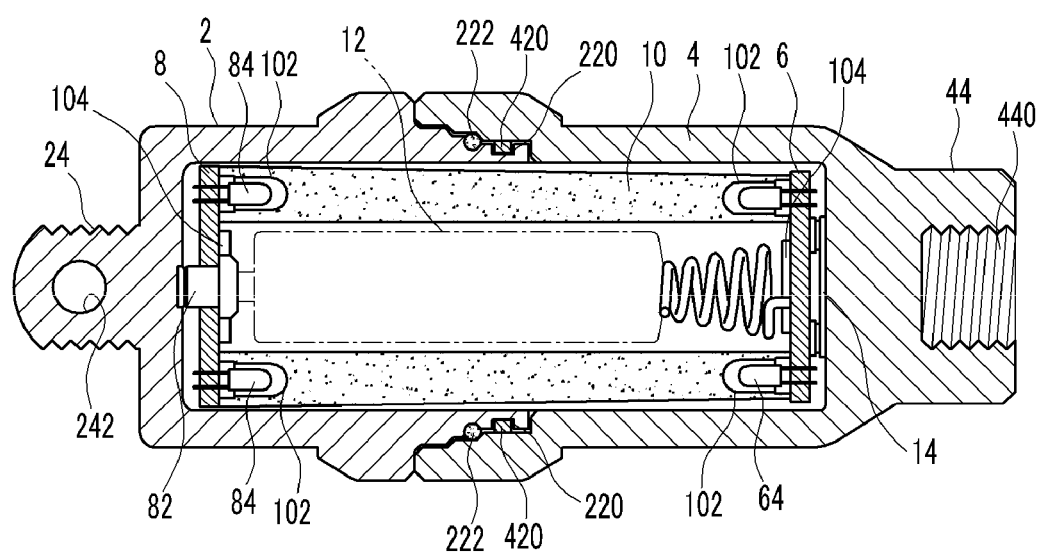
FIG. 2 is a cross-sectional side view of FIG. 1 in an assembled state.

In addition, in order to continuously connect two or more light emitting means, male threads 240 should be provided to the stud 24 of the first housing 2 and a holed boss 44 formed with female threads 440 should be provided to the second housing 4 corresponding thereto, as shown in FIG. 2, such that the stud 24 of the first housing 2 can be screwed into the holed boss 44 of another light emitting means.

As shown in the cross-section of the assembly of FIG. 2, the first substrate 6, the second substrate 8, and the tubular diffuser 10 are provided in a space that is limited by the first housing 2 and the second housing 4, and a battery 12 is provided inside the tubular diffuser 10 to supply power to the first and second substrates 6 and 8.

For turning power on and off, a typical switching means (not shown) may be formed at the outside of the first housing 2 or the second housing 4, or a switch panel 14 that turns the four LEDs 64, 64, 84, and 84 on and off by contacting the second substrate 8 may be provided inside the first housing 2 or the second housing 4 to turn the four LEDs 64, 64, 84, and 84 on and off according to the relative rotation of the first and second housings 2 and 4.

When the switch panel 14 is employed, the guide groove 220 formed in a step shape by differentiating the heights of the first step 220a and the second step 220b sets a reliable on/off location by the relative rotation between the first and second housings 2 and 4.

Light of the LEDs 64, 64, 84, and 84 that emit light when switched on is diffused through the tubular diffuser 10 and radiated after passing through the first and second housings 2 and 4, and during this process, a blinking effect may be realized by using a function of the IC chip 66.

In addition, multi-color light emission may be realized by arranging the four LEDs LED 64, 64, 84, and 84 with different colors. Blue, green, white, and red have been known as colors that can be realized by LEDs, and, when this is applied to the present invention, 58 combinations of patterns, i.e., 4 combinations of single colors, 18 combinations of two colors, 24 combinations of three colors, and 12 combinations of four colors, can be realized.

TABLE 1

| Pattern No. | One LED 64 | Other LED 64 | One LED 84 | Other LED 84 | Note |
| --- | --- | --- | --- | --- | --- |
| 1 | green | green | green | green | single color |
| 2 | blue | blue | blue | blue | single color |
| 3 | white | white | white | white | single color |
| 4 | red | red | red | red | single color |
| 5 | green | blue | green | blue | 2 colors |
| 6 | green | red | green | red | 2 colors |
| 7 | green | white | green | white | 2 colors |
| 8 | blue | red | blue | red | 2 colors |
| 9 | blue | white | blue | white | 2 colors |
| 10 | red | white | red | white | 2 colors |
| 11 | green | green | blue | blue | 2 colors |
| 12 | blue | blue | green | green | 2 colors |
| 13 | green | green | red | red | 2 colors |
| 14 | red | red | green | green | 2 colors |
| 15 | green | green | white | white | 2 colors |
| 16 | white | white | green | green | 2 colors |
| 17 | blue | blue | red | red | 2 colors |
| 18 | red | red | blue | blue | 2 colors |
| 19 | blue | blue | white | white | 2 colors |
| 20 | white | white | blue | blue | 2 colors |
| 21 | red | red | white | white | 2 colors |
| 22 | white | white | red | red | 2 colors |
| 23 | green | blue | green | red | 3 colors |
| 24 | green | red | green | blue | 3 colors |
| 25 | green | green | green | white | 3 colors |
| 26 | green | white | green | blue | 3 colors |
| 27 | green | red | green | white | 3 colors |
| 28 | green | white | green | red | 3 colors |
| 29 | blue | green | blue | red | 3 colors |
| 30 | blue | red | blue | green | 3 colors |
| 31 | blue | green | blue | white | 3 colors |
| 32 | blue | white | blue | green | 3 colors |
| 33 | blue | red | blue | white | 3 colors |
| 34 | blue | white | blue | red | 3 colors |
| 35 | red | green | red | blue | 3 colors |
| 36 | red | blue | red | green | 3 colors |
| 37 | red | green | red | white | 3 colors |
| 38 | red | white | red | green | 3 colors |
| 39 | red | blue | red | white | 3 colors |
| 40 | red | white | red | blue | 3 colors |
| 41 | white | green | white | blue | 3 colors |
| 42 | white | blue | white | green | 3 colors |
| 43 | white | green | white | red | 3 colors |
| 44 | white | red | white | green | 3 colors |
| 45 | white | blue | white | green | 3 colors |
| 46 | white | red | white | blue | 3 colors |
| 47 | green | blue | red | white | 4 colors |
| 48 | red | white | green | blue | 4 colors |
| 49 | green | blue | white | red | 4 colors |
| 50 | white | red | green | blue | 4 colors |
| 51 | green | red | blue | white | 4 colors |
| 52 | blue | white | green | red | 4 colors |
| 53 | green | red | white | blue | 4 colors |
| 54 | white | blue | green | red | 4 colors |
| 55 | green | white | blue | red | 4 colors |
| 56 | blue | red | green | white | 4 colors |
| 57 | green | white | red | blue | 4 colors |
| 58 | blue | red | white | green | 4 colors |

Since the light emitting means according to the present invention can realize a varicolored light emission ornament through the various types of multi-colored patterns, color combinations can be more various when it is used as a fishing light so that an optimal color combination providing a good fishing lure effect can be selected.

Figure 3:
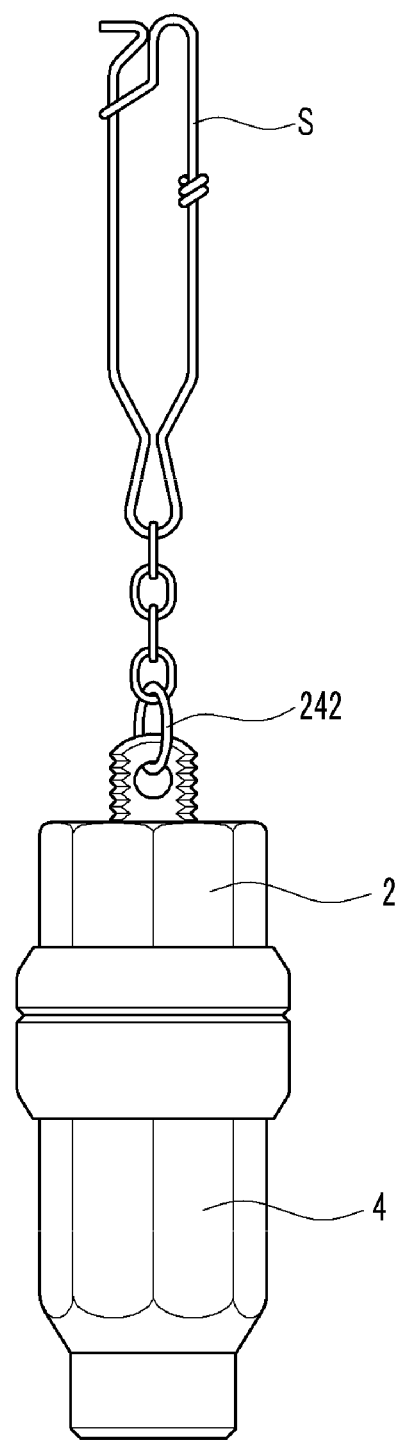
FIG. 3 shows a light emitting means that is exclusively used as a fishing light.

In addition, the light emitting means according to the present invention can be used as a fishing light for the long-line fishery by connecting a snap S to the hole 242 of the stud 24 formed in the first housing 2, as shown in FIG. 3.

The light emitting means according to the present invention can provide a light ornament effect by continuously connecting several light emitting means by the stud 24 and the holed boss 44 respectively formed in the first and second housings 2 and 4.

Figure 4:
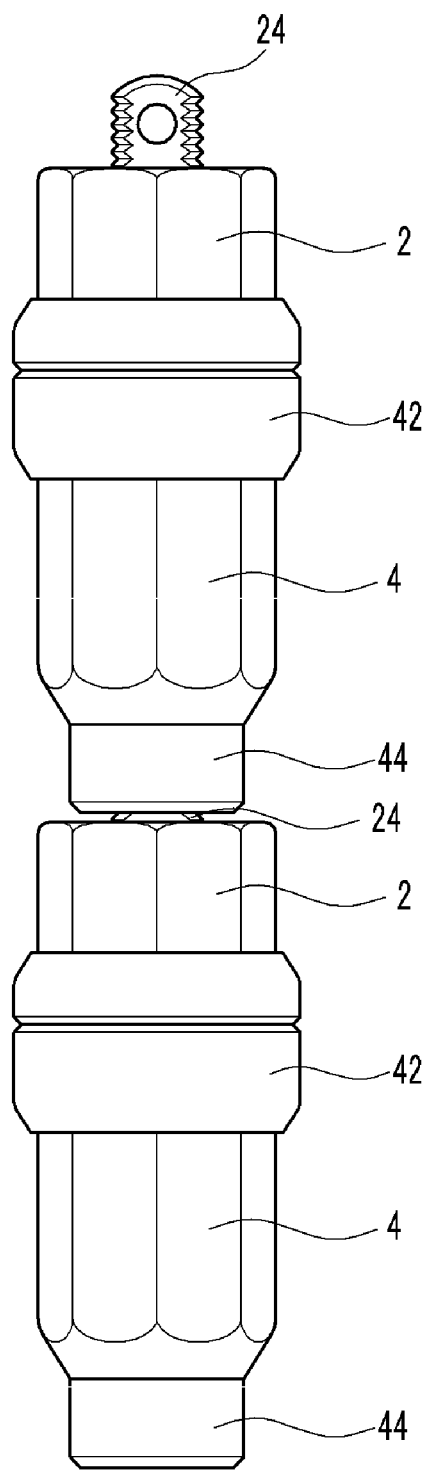
FIG. 4 is a side view of an example of an axis direction connection of the light emission means according to the present invention.

FIG. 4 shows continuous connection of a first light emitting means and a second light emitting means by screwing a stud 24 formed in a first housing 2 of the first light emitting means into a holed boss 44 formed in a second housing 4 of the second light emitting means, and this can be realized without an additional connector.

The light emitting means according to the present invention can provide a more variously shaped light emitting ornament by using a separate connector.

Figure 5:
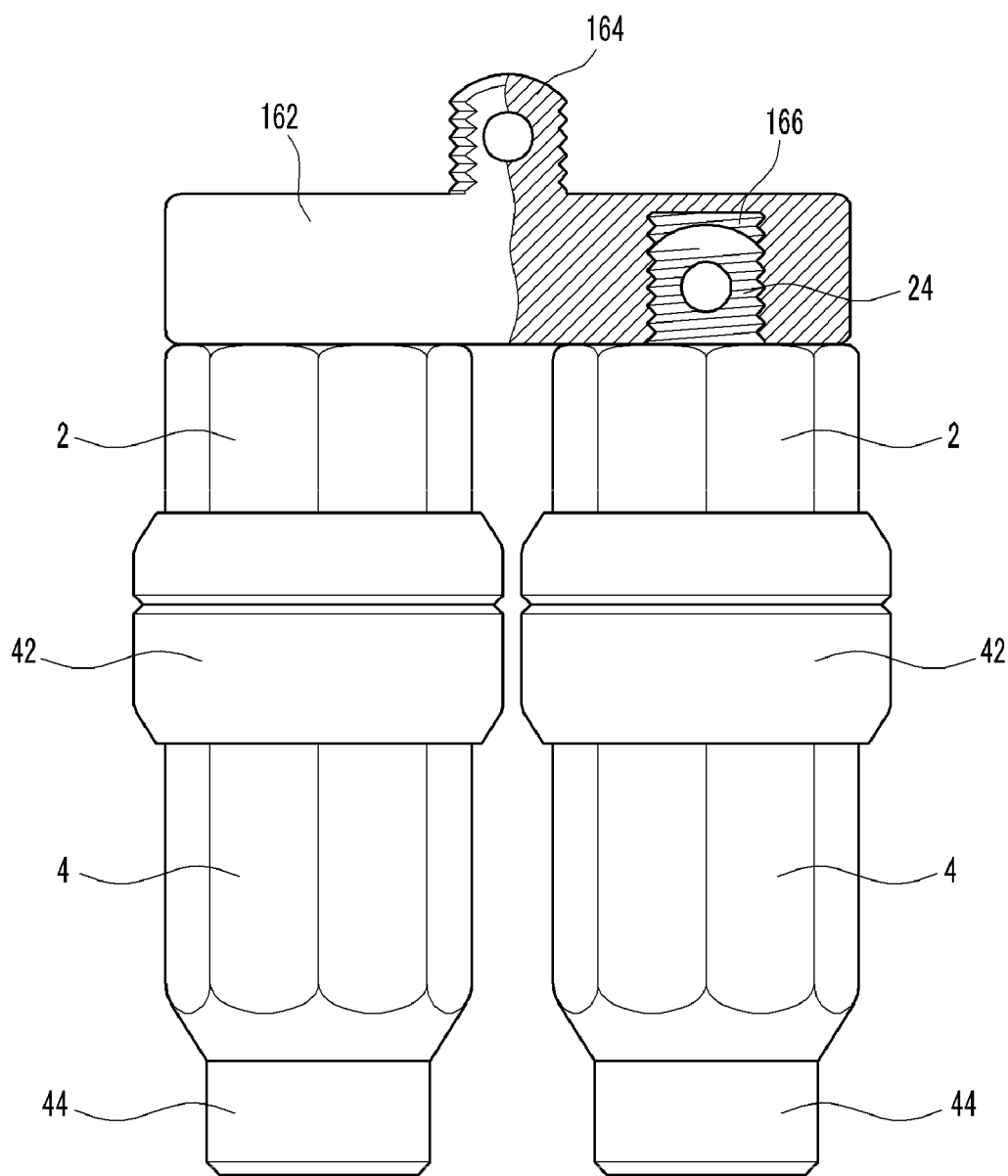
FIG. 5 is a partial cross-sectional side view of a structure of a bi-directional connector for the light emission means according to the present invention.
Figure 6:
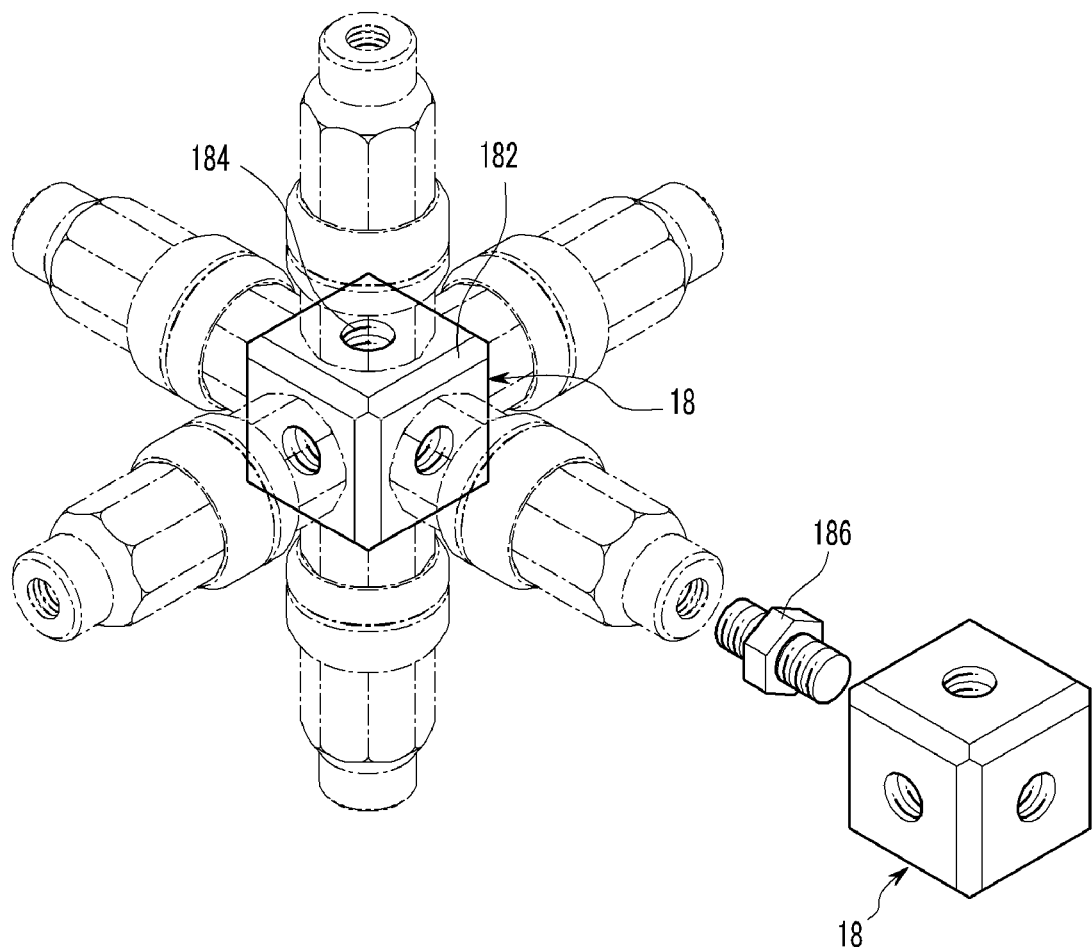
FIG. 6 is a perspective view of a structure and a use example of a cube connector for the light emission means according to the present invention.

Connectors that are appropriate for the light emitting means according to the present invention are illustrated in FIG. 5 and FIG. 6.

A connector 16 shown in FIG. 5 includes a rectangular-shaped body 162, a connector stud 164 with a hole 166 formed at one side of the body 162 respectively corresponding to the stud 24 and the hole 242 of the first housing 2, and a pair of threaded holes 166 into which the stud 24 formed in the first housing 2 is screwed at the opposite side of the body 162.

When one connector 16 is used, the light emitting means according to the present invention are arranged as a pair in parallel along the axis direction, and the light emitting means can extend as a plurality of parallel pairs by connecting the connector stud 164 to a threaded hole 166 of another connector 16.

A cube connector 18 shown in FIG. 6 has a cube-shaped body with a threaded hole 184 integrally formed at each surface of the cube body 182, and the first housing 2 and the cube connector 18 can be connected in up to six directions by screwing a stud 24 of a first housing 2 into each of the threaded holes 184. In addition, the cube connector 18 may further include a double-male connector 186.

The double-male connector 186 has a threaded stud at each end thereof such that either end can connect with the second housing 4 of the light emitting means connected to the cube connector 18, another cube connector 18, or a second housing 4 of another light emitting means, and the double-male connector 186 is useful for producing three-dimensional light emitting ornaments since it enables continuous three-dimensional connection of the light emitting means of the present invention.

Figure 7:
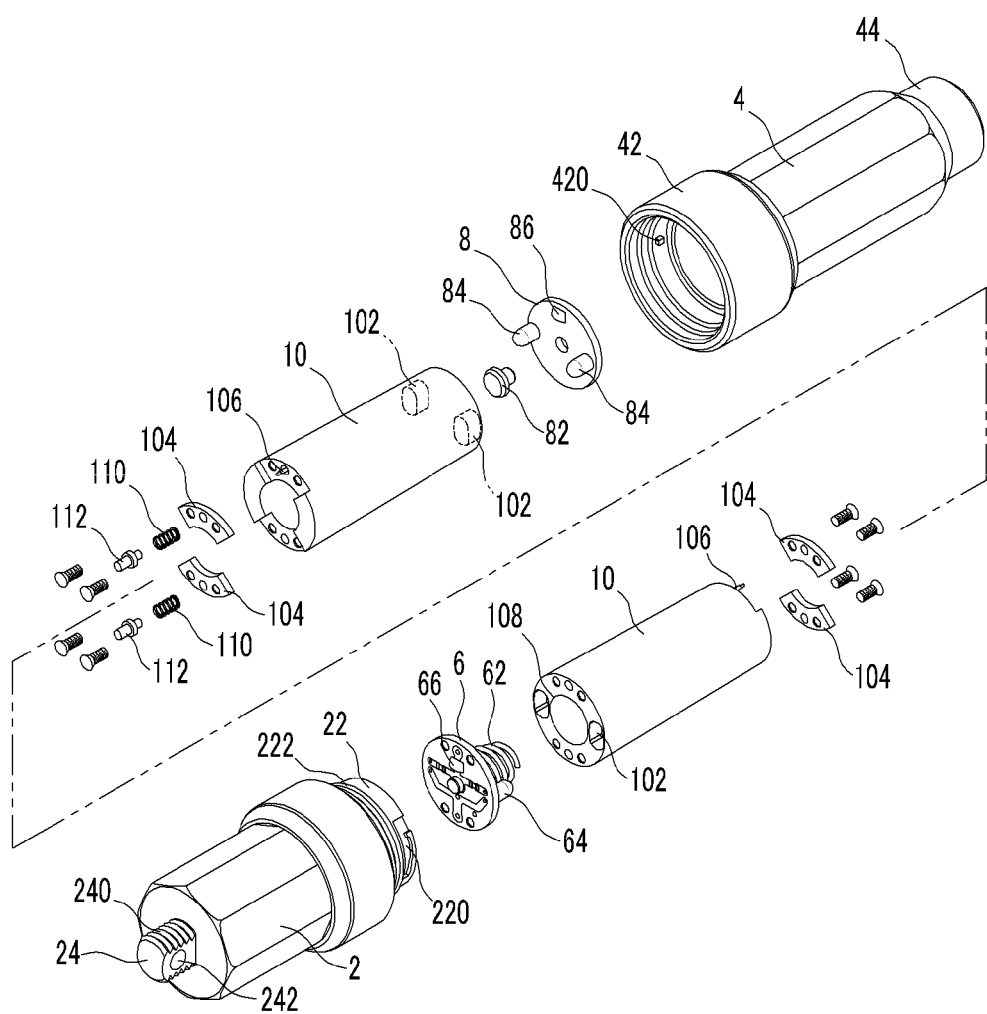
FIG. 7 is an exploded perspective view of a light emission means according to another exemplary embodiment of the present invention, corresponding to FIG. 1.
Figure 8:
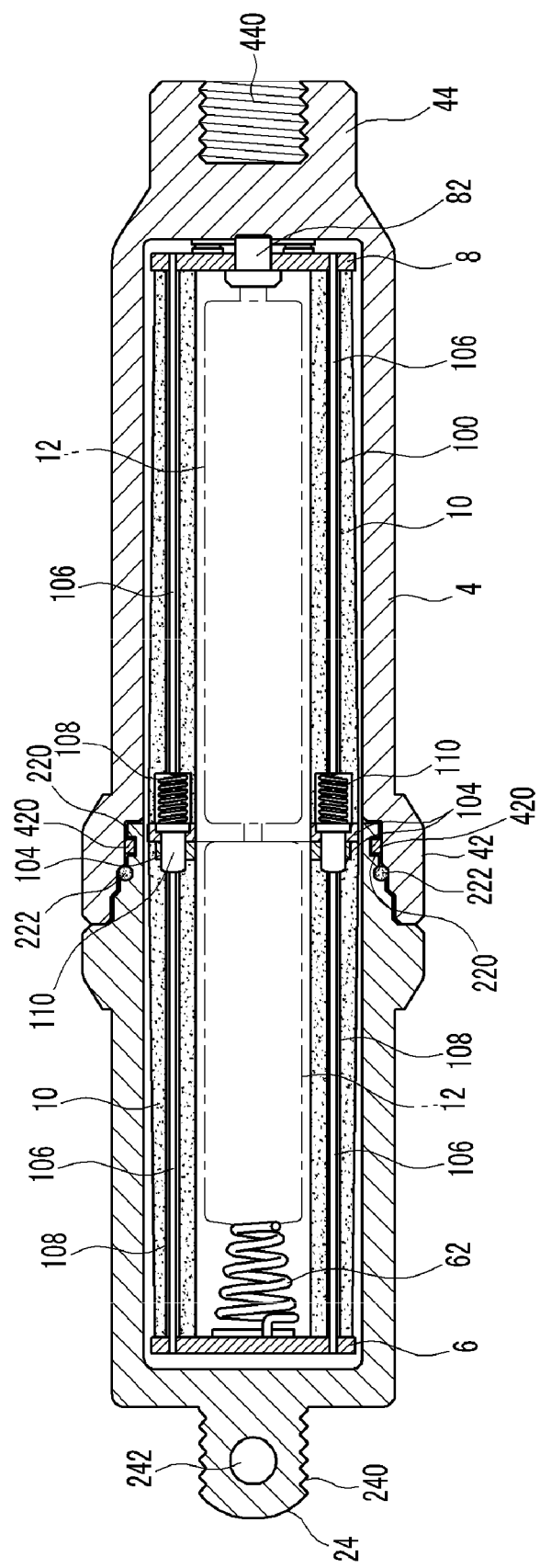
FIG. 8 is a cross-sectional side view of an assembled state of the light emission means of FIG. 7, corresponding to FIG. 2.

The light emitting means according to the present invention can be realized in a structure as shown in FIG. 7 and FIG. 8.

FIG. 7 is an exploded perspective view of a light emitting means according to another exemplary embodiment of the present invention. The light emitting means includes a first housing 2, a second housing 4, a first substrate 6, a second substrate 8, and a pair of tubular diffusers 10. Like the above exemplary embodiment, the first and second housings 2 and 4 are separated or coupled in the axis direction and made of a colorless or colored transparent material, and the first and second substrates 6 and 8 are interposed between the first and second housings 2 and 4. However, unlike the above exemplary embodiment, the pair of tubular diffusers 10 are disposed in the axis direction with a conductive plate 104 interposed between the pair of tubular diffusers 10. In the present exemplary embodiment, when the light emitting means is used individually, a plug 22 having a guide groove 220 and an O-ring 222 and a socket 42 having an inward protrusion 420 are respectively formed at the coupling portions of the first and second housings 2 and 4, and when the light emitting means is used as a fishing light, it additionally includes a stud 24 having a hole 242 at an opposite side to the plug in the first housing 2.

In addition, such that two or more light emitting means may be continuously connected, male threads 240 are provided to the stud 24 in the first housing 2 and a holed boss 44 having female threads 440 (refer to FIG. 8) formed at the opposite side to the socket 42 is provided in the second housing 4.

Unlike the above exemplary embodiment, the present exemplary embodiment has a structure in which lateral ends of a lead wire 106 that is connected to a conductive plate 104 at the ends of the pair of tubular diffusers 10 and extends through the tubular diffusers 10 conduct through a bush conductor 112 that is tensioned by a spring 110 of the conductive plate 104 interposed between the two tubular diffusers 10, and a pair of batteries 12 may be arranged in series within the tubular diffusers 10.

The bush conductor 112 is provided to conduct a current through the space between the lead wires 106 of the two tubular diffusers 10.

In the present exemplary embodiment, the capacity of the two batteries 12 is sufficient to drive four LEDs 64, 64, 84, and 84. In addition, light patterns including 4 combinations of single colors, 18 combinations of two colors, 24 combinations of three colors, and 12 combinations of four colors can be realized by the four LEDs 64, 64, 84, and 84.

Further, since the first housing 2 and the second housing 4 respectively include one tubular diffuser 10 and one battery 12 therein, the light emitting means according to the present exemplary embodiment of the present invention provides greater light emission capacity than the light emitting means of the above exemplary embodiment, and a light ornament effect is greater because of the two tubular diffusers 10.

The connector 16 and the cube connector 18 shown in FIG. 5 and FIG. 6 can be applied to the light emitting means of the present exemplary embodiment.

[Industry Applicabililty]

The light emitting means according to the present invention can be used as a portable light ornament or a mounted light ornament by assembly, and can also be used as a fishing light for the long-line fishery.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A light emitting means comprising:
   a first housing made of a transparent material and having one end formed as a plug;
   a second housing made of a transparent material, and having a socket corresponding to the plug and that can be separated or coupled to the first housing;
   a first substrate having a cathode at the center thereof and LEDs arranged around the cathode;
   a second substrate having an anode at the center thereof and LEDs arranged around the anode; and
   a tubular diffuser made of a light guide material and having mounting holes in which the LEDs are respectively mounted and a space to which a battery is provided therein.

2. The light emitting means of claim 1, wherein the first housing comprises a stud having a hole at an opposite side to the plug.

3. The light emitting means of claim 2, wherein a typical snap is connected through the hole formed in the stud of the first housing for use as a fishing light.

4. The light emitting means of claim 2, wherein a guide groove of the plug comprises a path with a step shape formed by differentiating heights of first and second steps to introduce a protrusion of the socket to the two steps during relative rotation of the first and second housings.

5. The light emitting means of claim 2, wherein a combination of light emitting colors by the LEDs of the first substrate and the LEDs of the second substrate is realized by one selected from patterns of blue, green, white, and red colors, the patterns including four combinations of single colors, eighteen combinations of two colors, twenty four combinations of three colors, and twelve combinations of four colors.

6. The light emitting means of claim 1, wherein the first housing comprises a stud having male threads and a hole at an opposite side to the plug, the second housing comprises a holed boss having female screw threads corresponding to the male screw threads, and the first and second substrates are electrically connected by a lead wire disposed in parallel with the tubular diffuser.

7. The light emitting means of claim 6, further comprising a connector formed as a rectangular body, having a threaded connector stud with a hole at one side thereof, and having a pair of threaded holes at the other side thereof such that the stud of the first housing can be screwed thereto.

8. The light emitting means of claim 6, further comprising a cube connector formed as a cube body, and having a threaded hole integrally formed at the center of an external surface of the cube body.

9. The light emitting means of claim 8, further comprising a double-male connector through which the holed boss of the second housing and the threaded hole of the cube connector may be connected.

10. The light emitting means of claim 6, wherein a guide groove of the plug comprises a path with a step shape formed by differentiating heights of first and second steps to introduce a protrusion of the socket to the two steps during relative rotation of the first and second housings.

11. The light emitting means of claim 6, wherein the tubular diffuser has a lead hole so that the lead wire extends through the lead hole.

12. The light emitting means of claim 6, wherein a typical snap is connected through the hole formed in the stud of the first housing for use as a fishing light.

13. The light emitting means of claim 1, wherein the tubular diffusers are provided as a pair and arranged in the same axis direction in the first and second housings, and at least two batteries are arranged in series therein.

14. The light emitting means of claim 13, wherein the first housing comprises a stud having male threads and a hole at an opposite end to the plug, the second housing comprises a holed boss having female threads corresponding to the male threads, the first and second substrates are electrically connected by lead wires arranged parallel with each of the tubular diffusers, and the lead wires are electrically connected to each other through a space therebetween by a bush conductor supported by a conductive plate between the two tubular diffusers while being tensioned by a spring.

15. The light emitting means of claim 14, wherein a guide groove of the plug comprises a path with a step shape formed by differentiating heights of first and second steps to introduce a protrusion of the socket to the two steps during relative rotation of the first and second housings.

16. The light emitting means of claim 13, wherein a guide groove of the plug comprises a path with a step shape formed by differentiating heights of first and second steps to introduce a protrusion of the socket to the two steps during relative rotation of the first and second housings.

17. The light emitting means of claim 13, further comprising a connector formed as a rectangular body, having a threaded connector stud with a hole at one side thereof, and having a pair of threaded holes at the other side thereof such that the stud of the first housing can be screwed thereto.

18. The light emitting means of claim 1, wherein a guide groove of the plug comprises a path with a step shape formed by differentiating heights of first and second steps to introduce a protrusion of the socket to the two steps during relative rotation of the first and second housings.

19. The light emitting means of claim 1, wherein the tubular diffuser has a lead hole so that the lead wire extends through the lead hole.

20. The light emitting means of claim 1, wherein a combination of light emitting colors by the LEDs of the first substrate and the LEDs of the second substrate is realized by one selected from patterns of blue, green, white, and red colors, the patterns including four combinations of single colors, eighteen combinations of two colors, twenty four combinations of three colors, and twelve combinations of four colors.

* * * * *